United States Patent
Waldon et al.

(10) Patent No.: US 9,529,704 B2
(45) Date of Patent: Dec. 27, 2016

(54) GRAPHICAL CONVERSION BETWEEN TEST PROGRAM LANGUAGES

(75) Inventors: Michael Waldon, Manor, TX (US); William Williams, Shrewsbury, PA (US); Olivia Schultz, Austin, TX (US)

(73) Assignee: AAI Corporation, Hunt Valley, MD (US)

(*) Notice: Subject to any disclaimer, the term of this patent is extended or adjusted under 35 U.S.C. 154(b) by 423 days.

(21) Appl. No.: 13/606,277

(22) Filed: Sep. 7, 2012

(65) Prior Publication Data

US 2014/0075416 A1    Mar. 13, 2014

(51) Int. Cl.
G06F 11/36    (2006.01)
G06F 9/45    (2006.01)

(52) U.S. Cl.
CPC ....... *G06F 11/3696* (2013.01); *G06F 11/3664* (2013.01); *G06F 8/427* (2013.01)

(58) Field of Classification Search
None
See application file for complete search history.

(56) References Cited

U.S. PATENT DOCUMENTS

| | | | |
|---|---|---|---|
| 5,610,828 A * | 3/1997 | Kodosky et al. | G01R 31/31912 345/418 |
| 5,950,004 A | 9/1999 | Bearse et al. | |
| 6,205,407 B1 | 3/2001 | Testa et al. | |
| 6,654,950 B1 | 11/2003 | Barnishan | |
| 7,184,917 B2 | 2/2007 | Pramanick et al. | |
| 7,389,474 B2 | 6/2008 | Rettig et al. | |
| 7,406,626 B2 | 7/2008 | Shen et al. | |
| 7,613,953 B2 | 11/2009 | Voruganti | |
| 7,669,188 B2 | 2/2010 | Nickell et al. | |
| 7,996,817 B1 | 8/2011 | Wen | |
| 8,132,161 B2 | 3/2012 | Kondo et al. | |
| 2003/0192030 A1* | 10/2003 | Hostettler | G06F 8/33 717/115 |
| 2004/0205406 A1 | 10/2004 | Kaliappan et al. | |
| 2005/0273685 A1 | 12/2005 | Sachdev et al. | |
| 2007/0092069 A1 | 4/2007 | Royzen et al. | |
| 2009/0271771 A1 | 10/2009 | Fallows | |

OTHER PUBLICATIONS

Daniel Fan, et al., Case Study—Using STIL as Test Pattern Language, IEEE, 2003, pp. 811-817.
Paul R. Salopek, Migration of Legacy Test Programs to Modern Programming Environments, IEEE, 2000, pp. 217-222.

* cited by examiner

*Primary Examiner* — Brian W Wathen
*Assistant Examiner* — Deric Ortiz
(74) *Attorney, Agent, or Firm* — Venable, LLP; Jeffri Kaminski

(57) ABSTRACT

A parser may be graphically modified without needing to directly alter the parser software and may be graphically modified to adjust for extensibility of the source test program language. The parser may be graphically modify to adjust for extensibility of the destination test program language and to translate a new text based test program language not inherently built into the parser.

7 Claims, 6 Drawing Sheets

GRAPHICAL CONVERSION BETWEEN TEST PROGRAM LANGUAGES

BACKGROUND

In current Test Program Language parsers, the vocabulary and syntax of the source and destination Test Program Languages are either hard coded directly into the parser or passed to the parser through the use of external configuration files. For example, the Abbreviated Test Language for All Systems (ATLAS) program language has a very specific lexical and syntactical content and is designed to be extensible. New features (i.e., nouns, modifiers) are added for each version of the ATLAS Language. Creating comprehensive parsers for a specific version of the ATLAS Language is both time intensive and cumbersome.

Modifications of the current Test Language parsers are not end user graphically extensible. They require a user to either create new configuration files or to modify the source code of the test program language parser to account for deviations in a source or destination test program languages due to extensibility of those test program languages. This also applies if the end user desires to translate a different source or destination test program language.

The problem with prior test program parser implementations is their fundamental inability to deal with new or extensible test program languages that were not part of the original design and scope of the parser program. In addition, any modifications required alteration of the original parser software code and are not end user graphically extensible In short, there exists a need in the art for a parser program that can be graphically extensible.

SUMMARY

According to an embodiment, a computer readable medium storing computer readable program code for causing a computer to perform the steps of presenting a graphical user interface; receiving input from a user; reconfiguring a text based parser for a text based test language based on the user input; and parsing the source test program file using the reconfigured text based parser is provided. Related methods are of performing the process are also included.

This summary is provided merely to introduce certain concepts and not to identify any key or essential features of the claimed subject matter. Further features and advantages of embodiments of the invention, as well as the structure and operation of various embodiments of the invention, are described in detail below with reference to the accompanying drawings.

BRIEF DESCRIPTION OF THE DRAWINGS

The foregoing and other features and advantages of embodiments of the invention will be apparent from the following, more particular description of embodiments of the invention, as illustrated in the accompanying drawings wherein like reference numbers generally indicate identical, functionally similar, and/or structurally similar elements. Unless otherwise indicated, the accompanying drawing figures are not to scale.

DETAILED DESCRIPTION

Various embodiments of the invention are discussed herein. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose. Embodiments of the invention may include the described process as well as software and hardware systems to carry out the described processes.

The implications of producing a graphically reconfigurable test program language parser are significant. The end user may graphically modify the parser without needing to directly alter the parser software and may graphically modify the parser to adjust for extensibility of the source test program language.

The parser may be graphically modify to adjust for extensibility of the destination test program language and to translate a new text based test program language not inherently built into the parser.

Graphical parsing software according to various embodiments of the invention may parse the text of the source test program language into a destination test program language using the following features:

1. Graphical manipulation of .NET regular expressions and string manipulations to control data extraction from the target test program language.
2. Closing expression capability to allow for control and manipulation of recursively embedded elemental tagged files such as HTML and XML.
3. User configurable data fields for storing and extracting parsed data.
4. User configurable state variable fields for storing data for transfer between different parsing operations.
5. Graphical manipulation of String Format functions and configurable data fields to convert data to a desirable format.
6. User configurable decision trees to allow customizable conversion actions based on parsed data and user defined actions.
7. Expandable and customizable conversion actions for translating one test program language to the next.
8. Selectable XML configuration files that are modified through the graphical interface.
9. Ability to load multiple input files into one parsing operation for test program languages that span multiple files.
10. Statistical converter actions for extracting user defined statics from parsing operations.

11. User configurable parsing log for tracking parsing operations.

Figure 1:
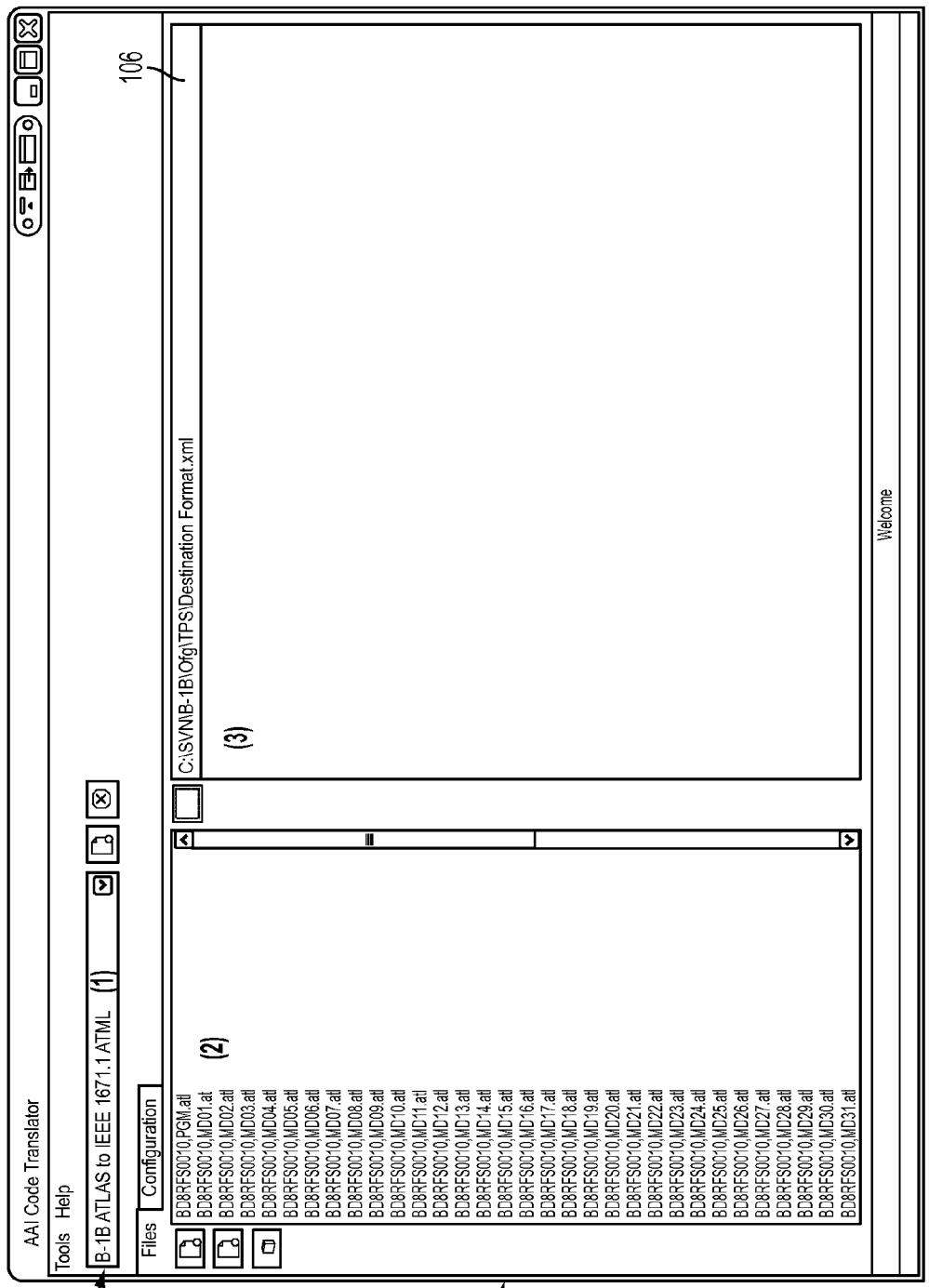
FIG. 1 illustrates a user interface configured for input and output file selection according to an embodiment of the present invention.

Referring now to FIG. 1, an exemplary user interface configured for configuration file selection, input file selection, and output file selection is described. The user interface 100 includes a field 102 for selecting the conversion configuration file. The configuration file may be an XML file that contains all the user selections and configurations performed within the user interface. The system may provide an option to select an existing configuration file for editing or to create a configuration file from scratch.

The files displayed in field 104 appear after the selection from a file dialog box. This is done by selecting the Add button in field 104. The types of files available through the dialog box are filtered based on the selected configuration file. Any number of files may be selected through the dialog box. The files may even be located in different locations. Files may be deselected by highlighting them and pressing the delete button. Once the total number of desired files are entered, the parser will acted upon all files listed in field 104.

Any number of different source files may be selected and then loaded for test program languages than span multiple source files. The converter performs conversions on the selected files in the order listed in field 104. A destination file path where the converted language is to be stored may be entered in field 106.

Figure 2:
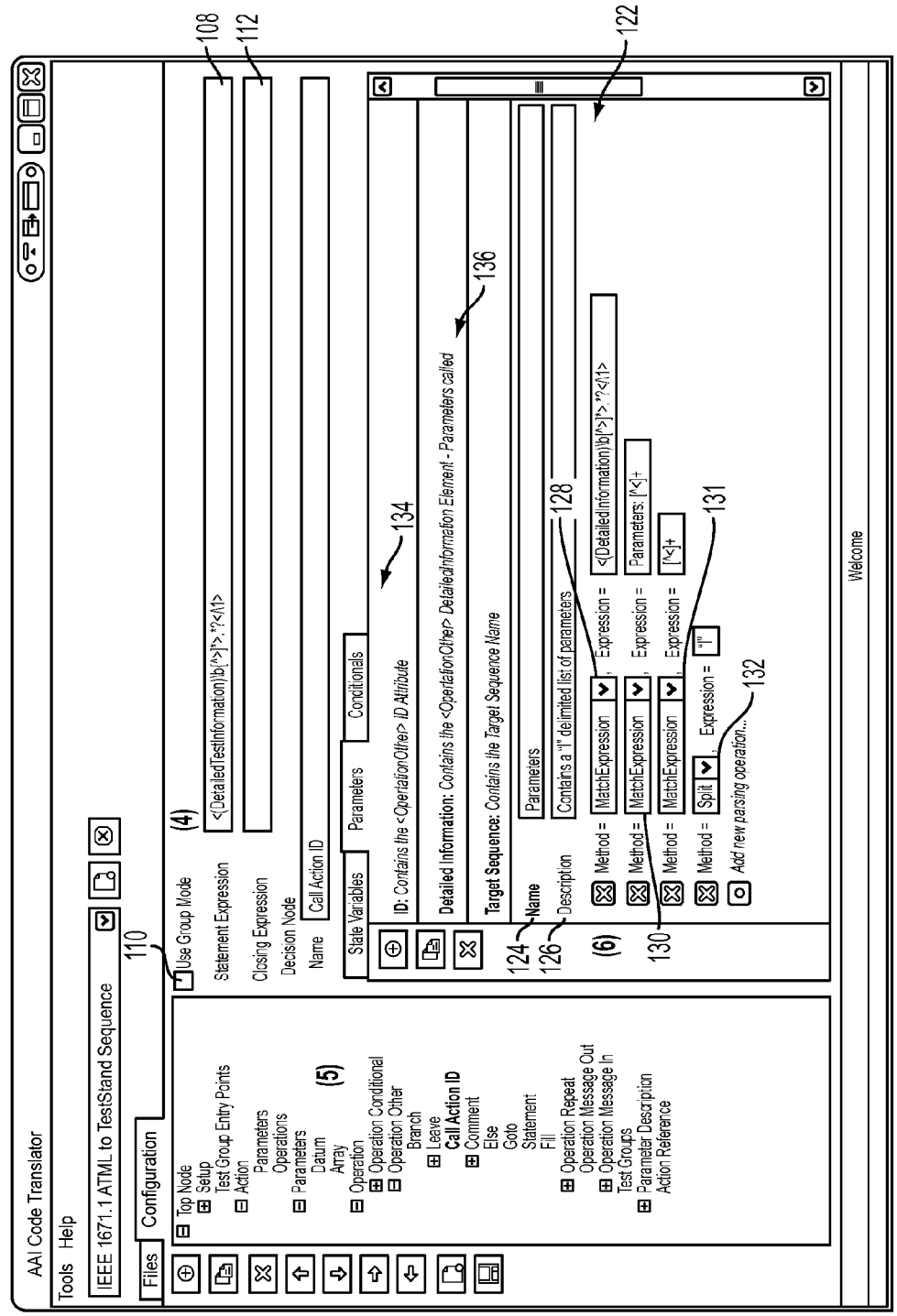
FIG. 2 illustrates the user interface configured for initialization expression modification, decision tree configuration, and data parameter customization according to an embodiment of the present invention.

FIG. 2 displays the user interface configured for initialization expression modification, decision tree configuration, and data parameter customization.

The parser may create a base statement by extracting data from the source files. The extraction may be based on a regular expression, a closing expression or a combination of both. The regular expression may be entered into field 108. The parser may use this regular expression to retrieve information from the source files to be parsed. Conversion from ATML is shown in the example of FIG. 2. 'Detailed TestInformation' is entered as the regular expression into field 108. The parser retrieves anything that deals with detailed test information from the identified source files. Depending on the conversion being performed, the base statement may include verbs, tags, function names and the like.

Additionally, a closing statement may be chosen by selecting grouping mode via check box 110 and entering the closing expression in field 112. The closing expression may act as a bookend to extract data that may be located inside the starting and ending lines of the source file(s). This may be useful for tag based languages such as XML.

When parsing begins, the translator acts upon the top node of the decision tree (5). The user can extract parameters from the base statement using the regular expression or drop down menus containing string manipulations. The parser will act sequentially upon the parameter methods until all have been performed. The resulting data is placed in the parameter field for use by the converter actions. Methods may be added and/or removed. The option to create as many parameters as necessary to successfully complete the conversion action may also be provided.

The functions provided at 122 allow the customization of parameters. A name for the parameter may be provided by a user in field 124. A description of the parameter may be provided in field 126. The description may aid the user to determine what the parameter is. The number of methods in (6) is variable. The ability to create/delete as many of these methods as desired may be provided via the dropdown menus 128-132. Each method parsers the data received from the node in the order the methods are selected. Though this action, the specific data associated with the parameter name may be obtained.

ID 134 and Detailed Information 136 are additional parameters. The ID function 134 is the id number of the code located by the variable expressions. The detailed information function 136 can use the regular expression to located the desired detailed information.

Parameters may be created or deleted for use in the current decision node through the add and delete buttons in (6) Data passed from the current Decision Node to the parameters may be parsed independently for each of the parameters. This enables any and all data passed from the Decision Node to be located in the desired parameters.

The decision tree may be customized via the graphical interface. If the file to be converted includes statements that are not accounted for in the parser, the parser may be modified graphically to account for these new statements. For example, a user may right click on a branch of the decision tree to add a new decision point. The actions to be taken at the decision point may be specified by defining new parameters via window 122.

Figure 3:
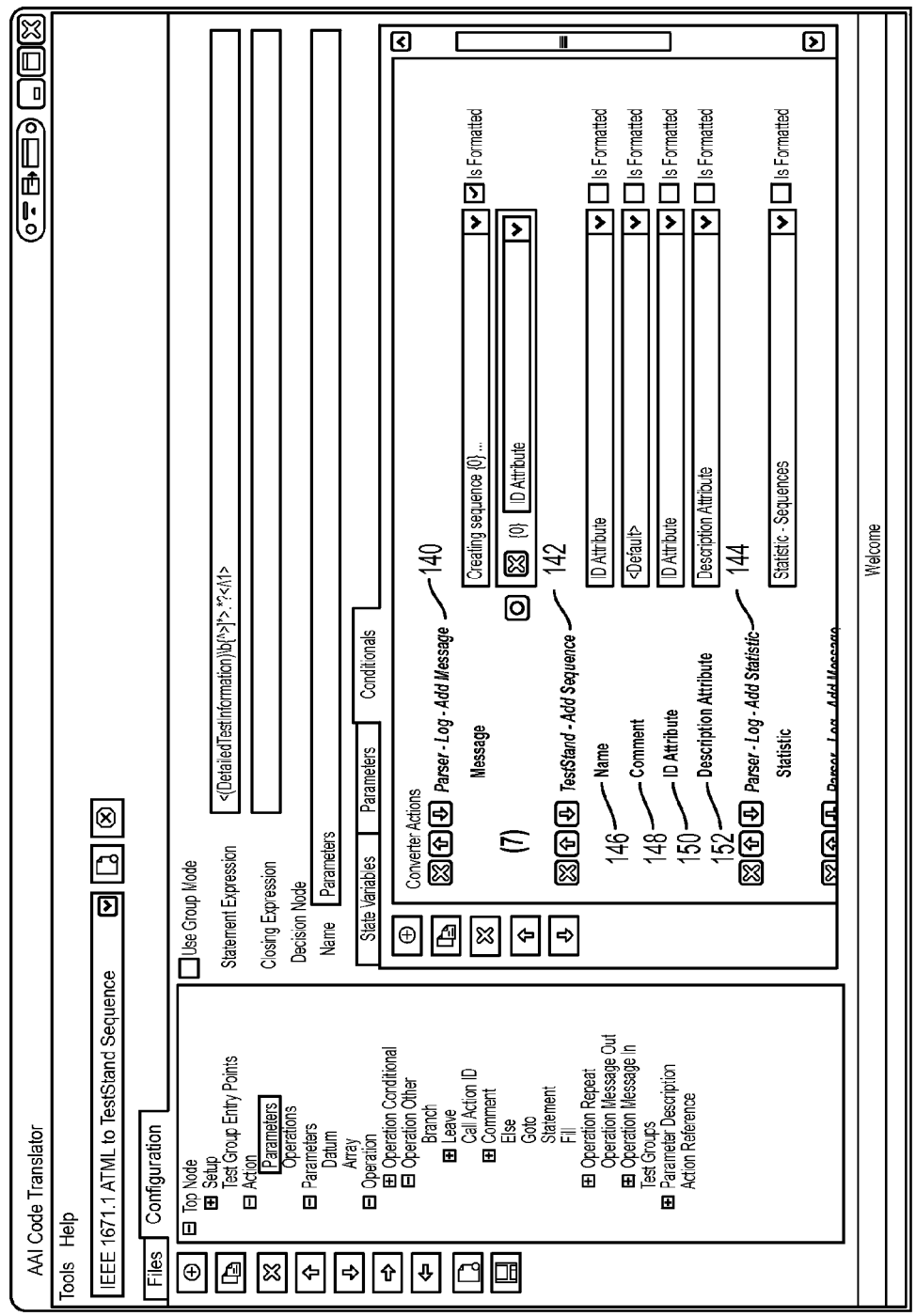
FIG. 3 illustrates the user interface for converter action modifications according to an embodiment of the present invention.

After the parameters are created, the parser then sequentially acts upon the base statement using the converter actions (7) and any created parameters (6). Conversion actions may either be a series of actions or a call to a lower node. The ability to add, reorder, modify, an/or remove the converter actions may be provided. Some examples of converter actions include parser-log-add message 140; teststand—add sequence 142; and parser-log-add statistic 144 as shown in FIG. 3. The system may automatically create the converter action. For example for the teststand—add sequence converter action, the name 146, comment 148, ID attribute 150, and description attribute 152 are added to the text file, XML file or desired target language. The drop down menus are populated automatically by the system based on the defined parameters.

Additional user-selectable formatting fields allow customization of how one or more parameters are used in the converter action field. Additional formatting lines may be added to combine parameters or to use literals to create the desired data passed into the converter action field. For example, the converter action for the ID attribute parameter is selected in drop down menu. The value for the ID attribute will populate the {0} in the sequence.

Lines of target text may be created by a user and stored in the destination file using the parameters and/or the converter actions. The input text, parameters and state variables may be combined using formatting converter actions to create the desired line of text. There is also an additional converter action that allows the operator to re-enter the top decision node and perform a parsing operation on either the input texted passed from the calling decision node or a user define set of text.

The operator may create additional decision nodes that then in turn call lower decision nodes in a tree structure. Once the parser exhausts all actions to the end of a branch, it starts again at the top node until all text contained in the base statement has been parsed.

State variables may be used to store data that is not dependent on the status of the parsing process. Parameters by contrast are dependent on the particular node that is being processed. For example, in FIG. 4, the "Call Action ID" node is highlighted. The information displayed by parameter tab and the conditional tab will vary based on the node selected, whereas the information displayed in the state variable tab is independent of the node. The state variable may be available to all nodes, any location.

Figure 4:
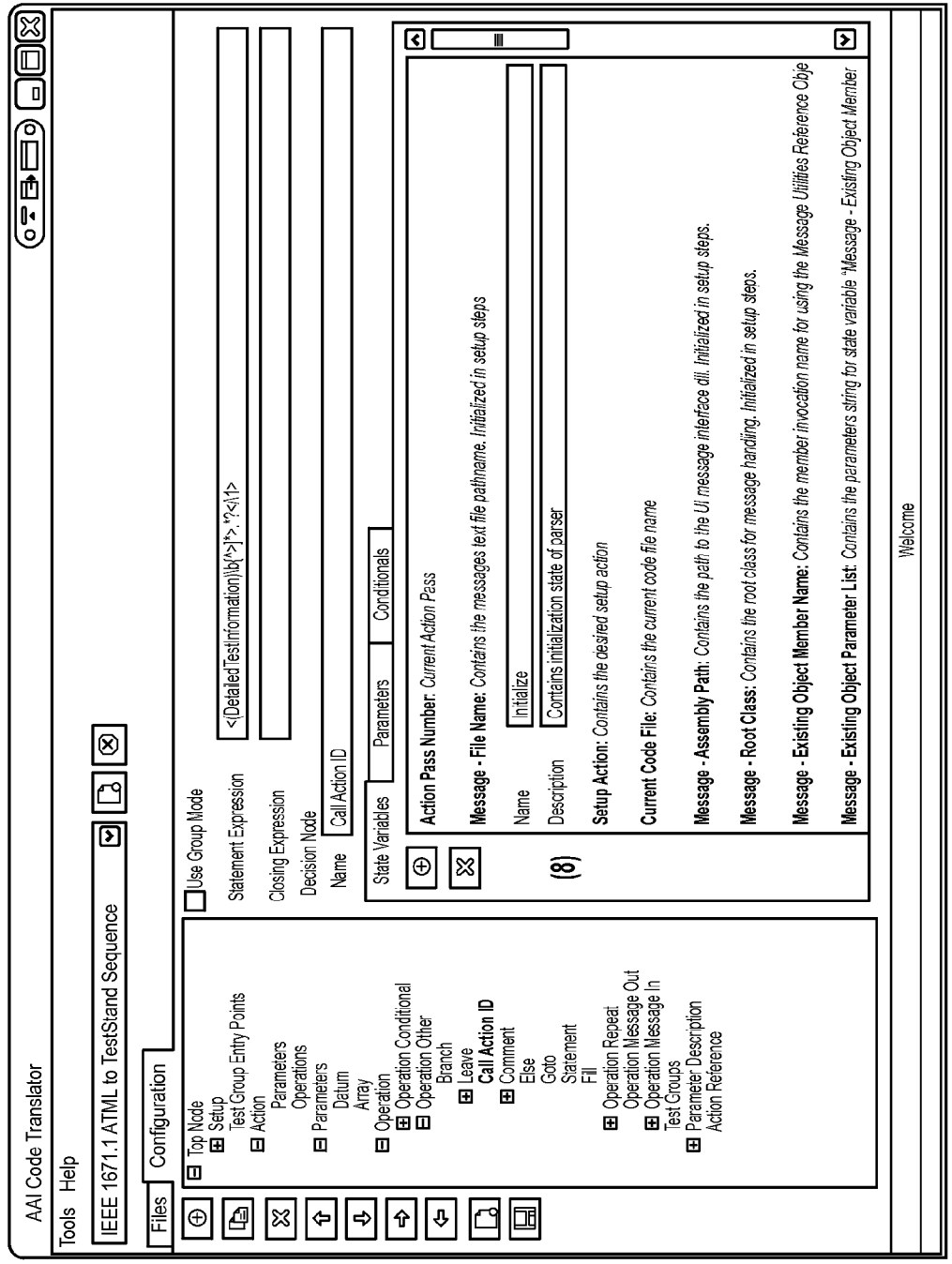
FIG. 4 illustrates the user interface for state variable setup according to an embodiment of the present invention.

FIG. 4 shows some examples of different state variables such as setup action, current code file, message-assembly path, message-root class, message existing object member name, and message-existing object parameter list. The different sate variable may be created and modified using the interface shown in FIG. 4.

Figure 5:
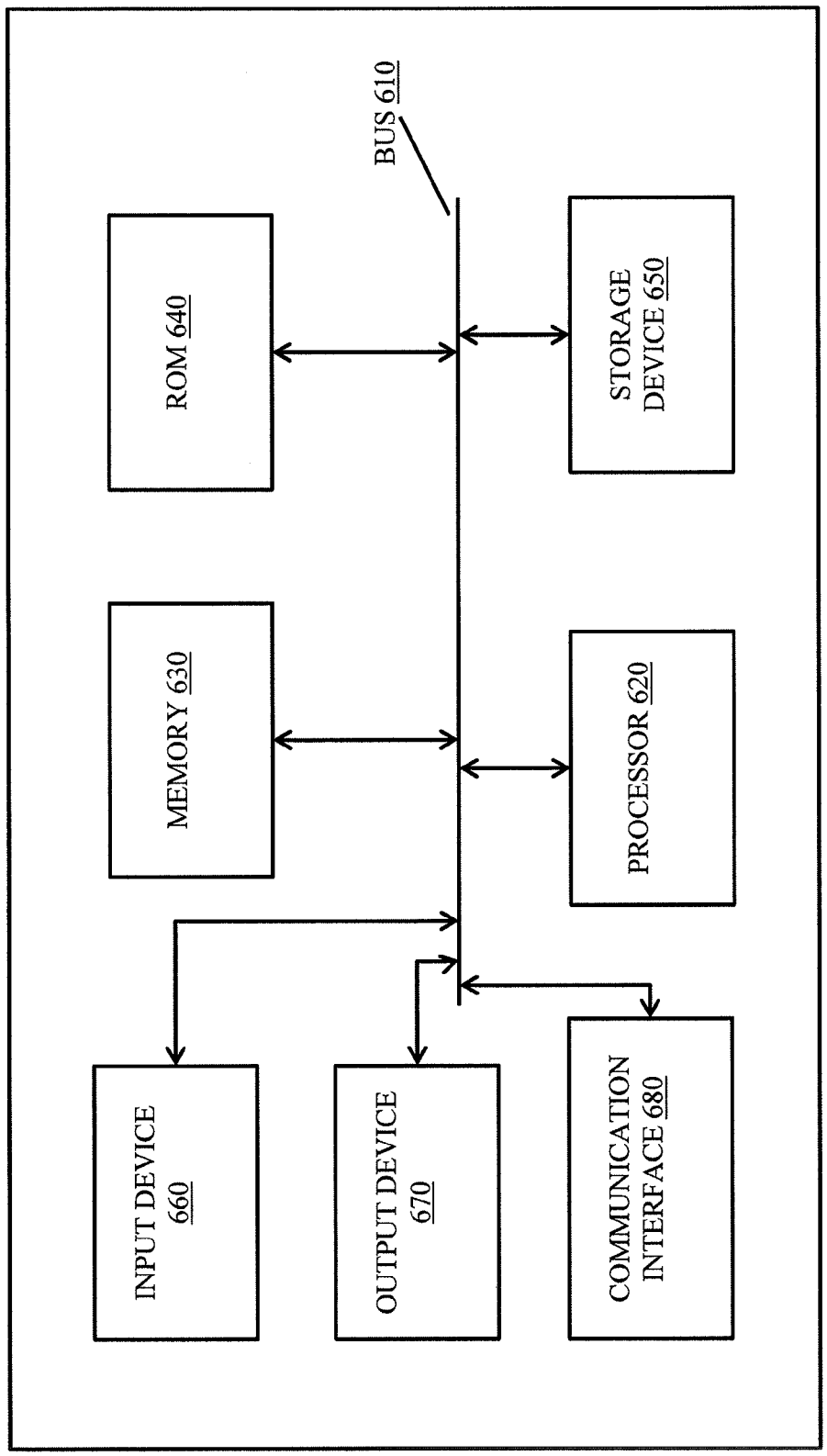
FIG. 5 depicts an exemplary architecture in accordance with one or more embodiments.
Figure 6:
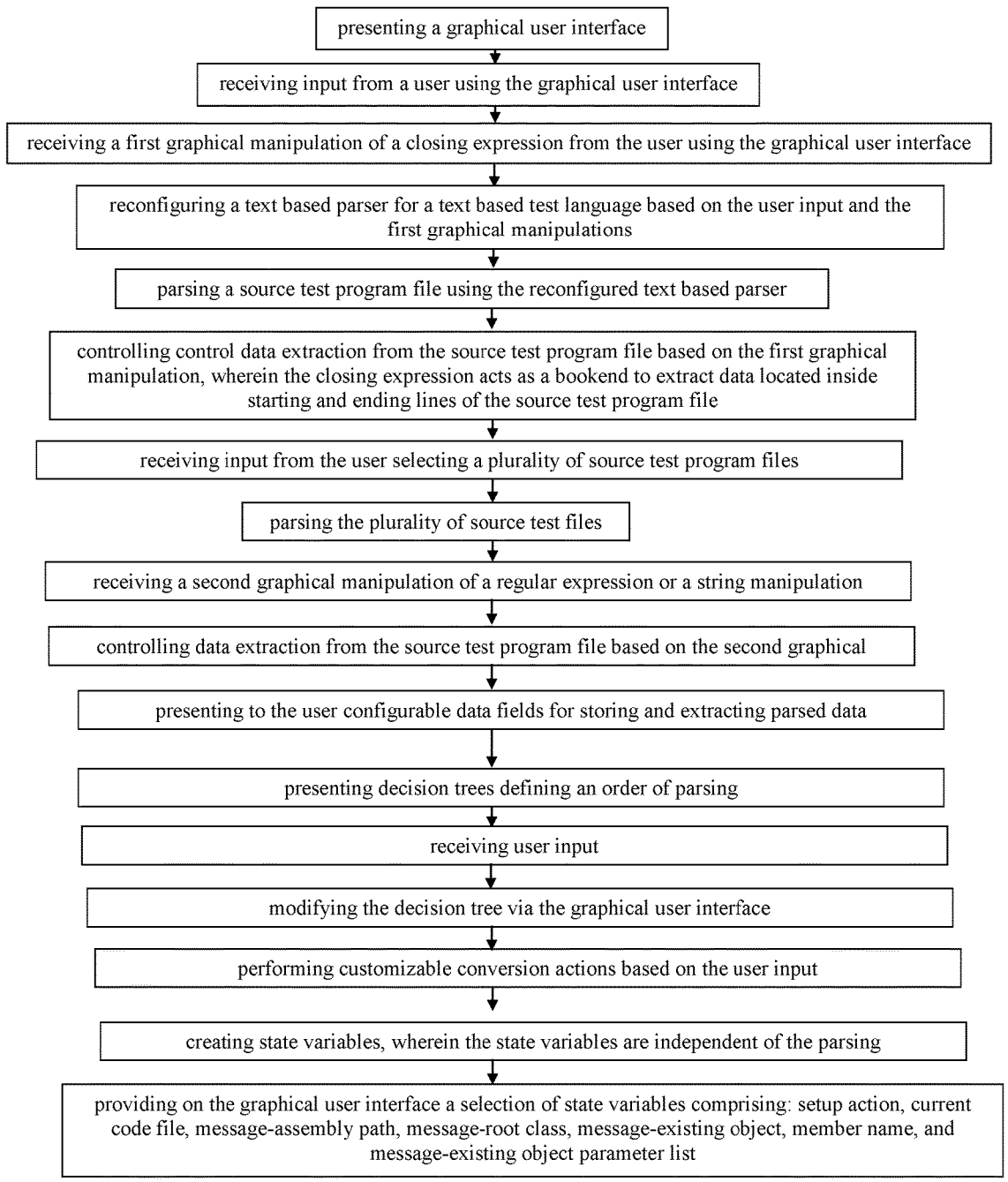
FIG. 6 depicts an example workflow in an embodiment of the invention.

FIG. 5 depicts an exemplary architecture for implementing a computing device 600 in accordance with one or more embodiments, which may be used to implement any of the processes describe above, or any other computer system or computing device component thereof. It will be appreciated that other devices that can be used with the computing device 600, such as a client or a server, may be similarly configured. As illustrated in FIG. 6, computing device 600 may include a bus 610, a processor 620, a memory 630, a read only memory (ROM) 640, a storage device 650, an input device 660, an output device 670, and a communication interface 680.

Bus 610 may include one or more interconnects that permit communication among the components of computing device 600. Processor 620 may include any type of processor, microprocessor, or processing logic that may interpret and execute instructions (e.g., a field programmable gate array (FPGA)). Processor 620 may include a single device (e.g., a single core) and/or a group of devices (e.g., multicore). Memory 630 may include a random access memory (RAM) or another type of dynamic storage device that may store information and instructions for execution by processor 620. Memory 630 may also be used to store temporary variables or other intermediate information during execution of instructions by processor 620.

ROM 640 may include a ROM device and/or another type of static storage device that may store static information and instructions for processor 620. Storage device 650 may include a magnetic disk and/or optical disk and its corresponding drive for storing information and/or instructions. Storage device 650 may include a single storage device or multiple storage devices, such as multiple storage devices operating in parallel. Moreover, storage device 650 may reside locally on the computing device 600 and/or may be remote with respect to a server and connected thereto via network and/or another type of connection, such as a dedicated link or channel.

Input device 660 may include any mechanism or combination of mechanisms that permit an operator to input information to computing device 600, such as a keyboard, a mouse, a touch sensitive display device, a microphone, a pen-based pointing device, and/or a biometric input device, such as a voice recognition device and/or a finger print scanning device. Output device 670 may include any mechanism or combination of mechanisms that outputs information to the operator, including a display, a printer, a speaker, etc.

Communication interface 680 may include any transceiver-like mechanism that enables computing device 600 to communicate with other devices and/or systems, such as a client, a server, a license manager, a vendor, etc. For example, communication interface 680 may include one or more interfaces, such as a first interface coupled to a network and/or a second interface coupled to a license manager. Alternatively, communication interface 680 may include other mechanisms (e.g., a wireless interface) for communicating via a network, such as a wireless network. In one implementation, communication interface 680 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 600 may perform certain functions in response to processor 620 executing software instructions contained in a computer-readable medium, such as memory 630. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

It will be understood that the above description of the present invention is susceptible to various modifications, changes and adaptations, and that the same are intended to be comprehended within the meaning and range of equivalents of the appended claims.

What is claimed is:

1. A non-transitory computer readable medium storing computer readable program code for causing a computer to perform steps of:
   presenting a graphical user interface;
   receiving input from a user using the graphical user interface;
   receiving a first graphical manipulation of a closing expression from the user using the graphical user interface;
   reconfiguring a text based parser for a text based test language based on the user input and the first graphical manipulations;
   parsing a source test program file using the reconfigured text based parser, and controlling control data extraction from the source test program file based on the first graphical manipulation, wherein the closing expression acts as a bookend to extract data located inside starting and ending lines of the source test program file.

2. The non-transitory computer readable medium of claim 1 storing computer readable program code for causing a computer to perform the steps further comprising:
   receiving input from the user selecting a plurality of source test program files; and
   parsing the plurality of source test files.

3. The non-transitory computer readable medium of claim 1 storing computer readable program code for causing a computer to perform the steps further comprising:
   receiving a second graphical manipulation of a regular expression or a string manipulation; and
   controlling data extraction from the source test program file based on the second graphical manipulation.

4. The non-transitory computer readable medium of claim 1 storing computer readable program code for causing a computer to perform the steps further comprising:
   presenting to the user configurable data fields for storing and extracting parsed data.

5. The non-transitory computer readable medium of claim 1 storing computer readable program code for causing a computer to perform the steps further comprising:
presenting decision trees defining an order of parsing;
receiving user input;
modifying the decision tree via the graphical user interface; and
performing customizable conversion actions based on the user input.

6. The non-transitory computer readable medium of claim 1, wherein the closing expression may be activated using a check box on the graphical user interface.

7. The non-transitory computer readable medium of claim 1 storing computer readable program code for causing a computer to perform the steps further comprising:
creating state variables, wherein the state variables are independent of the parsing; and
providing on the graphical user interface a selection of state variables comprising: setup action, current code file, message-assembly path, message-root class, message-existing object, member name, and message-existing object parameter list.

\* \* \* \* \*